US008807233B2

(12) United States Patent
Peltola et al.

(10) Patent No.: US 8,807,233 B2
(45) Date of Patent: Aug. 19, 2014

(54) METHOD AND EQUIPMENT FOR FIRE-FIGHTING

(75) Inventors: Esa Peltola, Vuorentausta (FI); Mikko Asumaniemi, Tampere (FI)

(73) Assignee: Bronto Skylift Oy AB (FI)

( * ) Notice: Subject to any disclaimer, the term of this patent is extended or adjusted under 35 U.S.C. 154(b) by 1151 days.

(21) Appl. No.: 10/568,792

(22) PCT Filed: Aug. 18, 2004

(86) PCT No.: PCT/FI2004/000487

§ 371 (c)(1), (2), (4) Date: Feb. 17, 2006

(87) PCT Pub. No.: WO2005/018747

PCT Pub. Date: Mar. 3, 2005

(65) Prior Publication Data

US 2007/0205005 A1 Sep. 6, 2007

(30) Foreign Application Priority Data

Aug. 22, 2003 (FI) ..................................... 20031186

(51) Int. Cl.

| | |
|---|---|
| ***A62C 2/00*** | (2006.01) |
| ***A62C 25/00*** | (2006.01) |
| ***A62C 31/22*** | (2006.01) |
| ***A01G 25/02*** | (2006.01) |
| ***B05B 7/04*** | (2006.01) |
| ***B05B 1/14*** | (2006.01) |
| ***B05B 1/00*** | (2006.01) |
| *A62C 27/00* | (2006.01) |
| *A62C 31/05* | (2006.01) |

(52) U.S. Cl.
CPC ................ *A62C 31/22* (2013.01); *A62C 27/00* (2013.01); *A62C 31/05* (2013.01)
USPC .................. 169/46; 169/45; 169/52; 169/70; 239/272; 239/597; 239/556; 239/433

(58) Field of Classification Search
USPC ......... 239/272, 433, 556, 567, 271, 589, 597; 169/52, 45, 46, 48, 70
See application file for complete search history.

(56) References Cited

U.S. PATENT DOCUMENTS 640,888 A * 1/1900 Dolan ........................... 239/429
2,224,010 A * 12/1940 Barber .......................... 239/271

(Continued)

FOREIGN PATENT DOCUMENTS

CN 20020135284 7/2002
EP 1369145 A1 12/2003

(Continued)

OTHER PUBLICATIONS

Pierce, Aug. 25, 2011, Merriam-Webster Dictionary.*

*Primary Examiner* — Len Tran
*Assistant Examiner* — Steven M Cernoch
(74) *Attorney, Agent, or Firm* — Seyfarth Shaw LLP

(57) ABSTRACT

A method for fire-fighting, a rescue boom and a nozzle of a piercing tool. A rescue boom is provided with an elongated piercing tool that can be pushed through a shell of a burning object. A fire extinguishing medium can be conveyed through the piercing tool to a nozzle provided in the piercing tool. The nozzle is provided with orifices arranged such that single jets form a single uniform jet having a flat curtain-like shape.

17 Claims, 4 Drawing Sheets

(56) References Cited

U.S. PATENT DOCUMENTS

| | | | | | |
|---|---|---|---|---|---|
| 2,246,797 | A | * | 6/1941 | Geddes | 239/271 |
| 2,653,449 | A | * | 9/1953 | Fritz | 405/45 |
| 2,813,753 | A | * | 11/1957 | Roberts | 239/271 |
| 2,993,650 | A | | 7/1961 | Hadberg | |
| 3,045,931 | A | * | 7/1962 | Hall | 239/598 |
| 3,069,100 | A | * | 12/1962 | Schuler | 239/522 |
| 3,252,661 | A | * | 5/1966 | Aldrich | 239/515 |
| 3,913,845 | A | * | 10/1975 | Tsuji | 239/556 |
| 4,043,397 | A | * | 8/1977 | Glowienke | 169/45 |
| 4,435,891 | A | * | 3/1984 | Nicholson | 29/890.143 |
| 4,485,877 | A | | 12/1984 | McMillan et al. | |
| 4,697,740 | A | * | 10/1987 | Ivy | 239/271 |
| 4,802,535 | A | * | 2/1989 | Bakke | 169/70 |
| 4,836,291 | A | * | 6/1989 | Owens et al. | 169/46 |
| 4,926,597 | A | * | 5/1990 | Landry | 47/52 |
| 5,125,579 | A | | 6/1992 | Eggert | |
| 5,253,716 | A | * | 10/1993 | Mitchell | 169/70 |
| 5,265,802 | A | * | 11/1993 | Hobbs et al. | 239/18 |
| 5,301,756 | A | * | 4/1994 | Relyea et al. | 169/24 |
| 5,649,599 | A | * | 7/1997 | Catanese, Jr. | 169/70 |
| 5,673,859 | A | * | 10/1997 | Haruch | 239/568 |
| 5,762,005 | A | * | 6/1998 | Parisi et al. | 110/234 |
| 5,913,367 | A | | 6/1999 | Hampton | |
| 5,921,472 | A | * | 7/1999 | Haruch | 239/432 |
| 5,979,799 | A | * | 11/1999 | Chen et al. | 239/430 |
| 6,098,896 | A | * | 8/2000 | Haruch | 239/8 |
| 6,398,136 | B1 | * | 6/2002 | Smith | 239/600 |
| 6,668,939 | B2 | * | 12/2003 | Schmidt et al. | 169/70 |
| 6,755,259 | B2 | * | 6/2004 | Peltola et al. | 169/47 |
| 2002/0179307 | A1 | * | 12/2002 | Schmidt et al. | 169/70 |

FOREIGN PATENT DOCUMENTS

| | | | | | |
|---|---|---|---|---|---|
| EP | 1369145 | A1 | * | 12/2003 | A62C 27/00 |
| JP | 2003250923 | A | | 3/2003 | |

* cited by examiner

METHOD AND EQUIPMENT FOR FIRE-FIGHTING

This application is a U.S. National Phase of International Patent Application Serial No. PCT/FI2004/000487, filed Aug. 18, 2004 which claims priority to Finnish Patent Application No. 20031186 filed Aug. 22, 2003.

BACKGROUND OF THE INVENTION

The invention relates to a method for fire-fighting, the method comprising: piercing a shell of a burning object by pushing at least one elongated piercing tool arranged in a rescue boom from the side of a first surface of the shell to the side of a second surface thereof; feeding, along at least one longitudinal channel in the piercing tool, a fire extinguishing medium to a nozzle provided in the piercing tool; and spraying the fire extinguishing medium to the side of the second surface of the shell through a plurality of orifices provided in the nozzle.

The invention further relates to a rescue boom comprising: a boom provided with at least one movable boom part connected to a base; at least one piercing tool arranged at a free end of the boom, the piercing tool being an elongated piece comprising at least one longitudinal channel; at least one actuator for moving the piercing tool in the longitudinal direction of the piercing tool with respect to an outermost end of the boom; at least one feed channel for feeding a fire extinguishing medium to the channel in the piercing tool; and at least one nozzle, which is an elongated piece and which is connected to the channel in the piercing tool, the fire extinguishing medium being arranged to be fed through a plurality of orifices provided in the nozzle.

The invention still further relates to a nozzle of a piercing tool for spraying a fire extinguishing medium, the nozzle being an elongated piece having a front end and a rear end and the nozzle comprising: fastening means at the rear end of the nozzle for fastening the nozzle to the piercing tool; at least one feed channel for feeding a fire extinguishing medium to the nozzle; and a plurality of orifices extending from the feed channel to an outer surface of the nozzle, the orifices being directed obliquely forwards such that the farther away from the front end of the nozzle a single orifice resides, the larger an acute angle between the middle axis of the orifice and the middle axis of the nozzle.

In fire-fighting, it is extremely important to get the extinguishing measures started quickly, before a fire gets out of control. In aircraft accidents, for example, a fire should be brought under control no later than during the first couple of minutes from the outset of the fire. In such a case, the fire-fighting equipment must be brought to the scene of fire without delay, and a fire extinguishing medium is to be fed quickly and without deconstruction of structures to the interior of a burning object. Thus, rescue booms arranged on a movable base have been provided that are equipped with a piercing tool capable of penetrating through the wall construction of a burning object. A piercing tool provided with a sharp tip is relatively easily capable of piercing the shell structures of vehicles or the like. After piercing, a fire extinguishing medium can be fed through the piercing tool directly to the burning object. In the prior art equipment, a fire extinguishing medium is sprayed through nozzles provided in the piercing tool evenly in every direction such that the shape of the resulting jet is circular. In practice, it has been found that such a shape of a jet is insufficient in situations where a fire is to be effectively prevented from expanding. The problem is thus the directing of a fire extinguishing medium jet.

BRIEF DESCRIPTION OF THE INVENTION

An object of the present invention is to provide a novel and improved method for fire-fighting as well as a rescue boom and a nozzle of a piercing tool to be used therein.

The method of the invention is characterized by directing a plurality of single jets expelled from the orifices so that they form a single uniform jet having a flat curtain-like shape.

The rescue boom of the invention is characterized in that in the longitudinal cross section of the nozzle, the orifices in the nozzle are arranged to pass via substantially the same imaginary plane so that the fire extinguishing medium fed through the orifices is arranged to form a single uniform jet having a flat curtain-like shape.

The nozzle of the invention is characterized in that in the longitudinal cross section of the nozzle, the orifices are arranged to pass via substantially the same imaginary plane so that the fire extinguishing medium fed through the orifices is arranged to form a single uniform jet having a flat curtain-like shape.

The idea underlying the invention is that a rescue boom is provided with a piercing tool equipped with a sharp tip so that the piercing tool can be punched or pushed through a shell of a burning object. The piercing tool is provided with one or more channels which enable a fire extinguishing medium to be conveyed therethrough to a nozzle which resides within a section of a free end of the piercing tool. The nozzle is provided with a plurality of orifices enabling the fire extinguishing medium to be discharged to a burning object. According to the invention, the orifices in the nozzle are arranged such that the single jets expelled from the orifices intersect one another, forming a single uniform jet having a flat curtain-like shape. In order to achieve a flat curtain-like jet, in the longitudinal cross section of the nozzle the orifices in the nozzle are arranged to pass via one imaginary plane.

An advantage of the invention is that the jet has a flat curtain-like shape, which enables the jet to be directed accurately. In addition, such a flat curtain-like jet can form a "wall" which enables an object to be extinguished to be confined. In aircraft fires, for example, a wall of a fire extinguishing medium can be formed between a seat of fire and the rest of a passenger cabin so that the fire can be prevented from expanding. Furthermore, the jet may serve as a wall to protect passengers exiting the passenger cabin.

The idea underlying an embodiment of the invention is that the entire piercing tool or, alternatively, only the nozzle, is turned around its longitudinal axis, which enables the position of the curtain-like jet to be changed.

The idea underlying an embodiment of the invention is that the piercing tool comprises a shank whose end is provided with a tip part comprising a detachable nozzle part and a detachable tip piece.

The idea underlying an embodiment of the invention is that gases formed in a fire can be prevented from expanding in a burning object by means of a curtain formed by a fire extinguishing medium. It is thus possible, for instance, to prevent toxic gases from expanding in a passenger cabin of an aircraft.

BRIEF DESCRIPTION OF THE DRAWINGS

The invention is now described in closer detail in the accompanying drawings, in which FIG. 1 schematically shows a rescue boom in accordance with the invention, arranged on a movable base, FIG. 2 schematically shows a part of a piercing tool in accordance with the invention, FIG. 3 schematically and as seen from direction A shows the cross section of the piercing tool shown in FIG. 2 and a curtain-like jet formed by a nozzle, FIG. 4 schematically and as seen from direction B shows a tip of the piercing tool in accordance with FIG. 2.

For the sake of clarity, the figures show the invention in a simplified manner. In the figures, like reference numerals identify like elements.

DETAILED DESCRIPTION OF THE INVENTION

Figure 1:
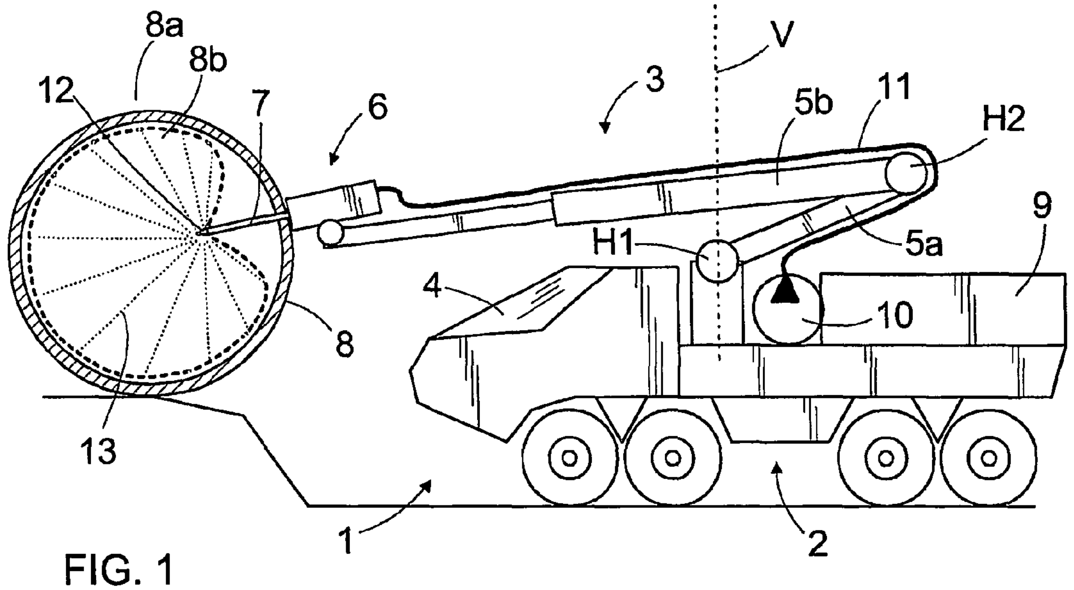

FIG. 1 shows a rescue vehicle 1 comprising an independently movable base 2, which may be any suitable vehicle, such as an all-terrain vehicle similar to that shown in FIG. 1. Alternatively, the movable base may be e.g. a trailer or a vessel. On the base 2 a rescue boom 3 is arranged which comprises at least one boom part movable with respect to the base 2. In the solution shown in FIG. 1, the boom 3 is arranged behind a cabin 4. The boom 3 comprises a first boom part 5*a* whose first end is connected to the base 2 such that the boom part 5*a* can be turned around a vertical axis V. Furthermore, a horizontal articulation H1 enables a second, i.e. an outermost end, of the first boom part 5*a* to be lifted and lowered. Furthermore, to the outermost end of the first boom part 5*a*, a second boom part 5*b* is connected such that its outermost end can be lifted and lowered with respect to a horizontal articulation H2 residing between the first boom part 5*a* and the second boom part 5*b*. The boom parts 5*a*, 5*b* can be moved e.g. by means of pressure medium operated cylinders or motors, or in some other manner known per se. For the sake of clarity, no actuators necessary for moving the boom are shown in FIG. 1. An outer end of the boom 3 is provided with a piercing device 6 comprising an elongated piercing tool 7 having a sharp tip, as well as means for pushing the piercing tool 7 from the side of a first surface 8*a* of a wall construction 8 to the side 8*b* of a second surface thereof. The piercing device 6 may comprise e.g. an impact device for striking the piercing tool 7 through the wall construction 8. The base 2 is further provided with a tank 9 for a fire extinguishing medium. The fire extinguishing medium is pumped to the piercing device 6 by means of a pump 10 along a feed channel 11. The feed channel 11 is connected to the piercing tool 7 such that the fire extinguishing medium can be fed along one or more longitudinal channels provided in the piercing tool 7 to a nozzle 12 in the piercing tool 7. The number of nozzles 12 may be one or larger. Orifices provided in the nozzle 12 are located so as to enable a uniform flat curtain-like jet 13 to be formed. Such a curtain-like jet 13 enables a "partition wall" to be formed in a burning object. The curtain-like jet 13 enables the burning object to be confined and also combustion gases and heat to be prevented from expanding on the scene of fire.

In the situation shown in FIG. 1, the base 2 has been driven near the body of an aircraft whereafter, by moving the boom 3, the piercing device 6 has been brought against the outer surface 8*a* of the body of the aircraft. The boom 3 is then held in place and the shell structure 8 of the wall of the aircraft is pierced by striking the piercing tool 7 therethrough. Next, by means of the piercing tool 7, a fire extinguishing medium is fed to a space 8*b* confined by the wall construction 8. The wall construction 8 may be pierced as many times as necessary, e.g. so as to enable curtain-like jets 13 to be provided on both sides of the seat of fire. The fire extinguishing medium may be water, fog formed by water and gas, fire fighting foam, fire fighting chemical or another suitable solid or liquid material or a mixture thereof. After a necessary amount of fire extinguishing medium has been fed, the piercing tool 7 is pulled out of the wall construction 8 by means of the piercing device 6, whereafter the piercing device 6, by moving the boom 3, can be moved to another place for further piercing and feeding of the fire extinguishing medium. In order to prevent the piercing tool 7 from damaging, the boom 3 may be stopped from moving altogether during a piercing procedure.

Figure 2:
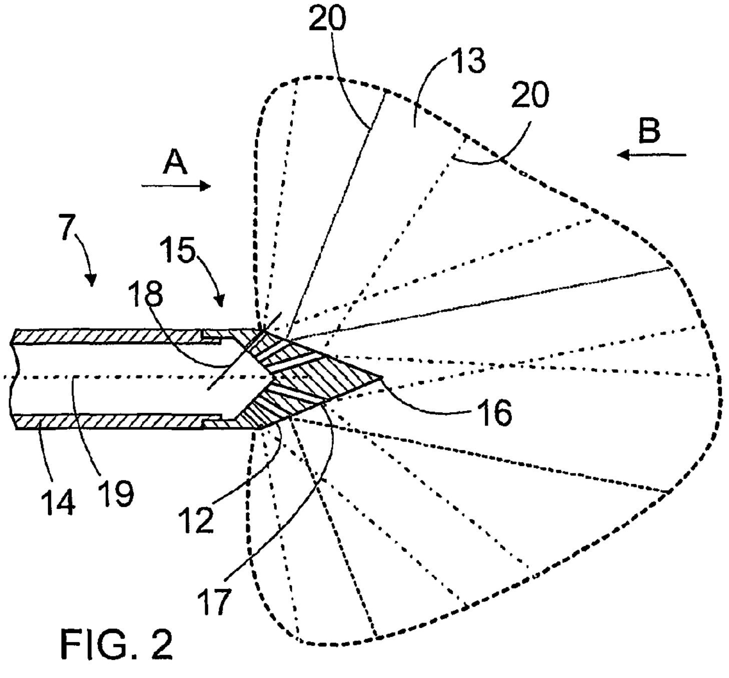
Figure 3:
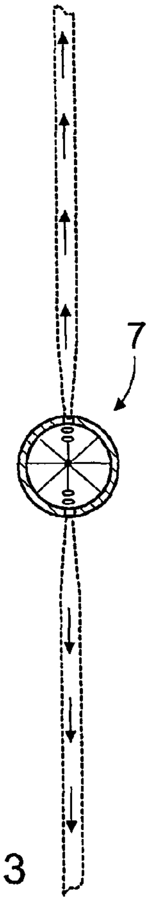
Figure 4:
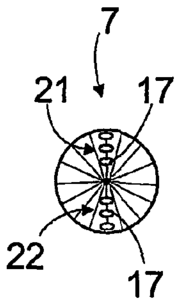

FIG. 2 partly shows a free end of a piercing tool 7. The piercing tool 7 comprises an elongated shank 14 whose end is provided with a tip part 15. The tip part 15 comprises an integrated sharp tip 16 for piercing a shell, and a nozzle 12 for spraying a fire extinguishing medium. The tip part 15 may be an integral part of the piercing tool 7 or it may be a replaceable separate piece which may be fastened e.g. by a screw joint to the tubular shaft 14. As can be seen, the nozzle 12 comprises a plurality of orifices 17 that are directed obliquely forwards. The angle position of the orifices 17 is selected such that the farther away from the front end of the nozzle an orifice 17 resides, the larger an acute angle between the middle axis 18 of the orifice and the middle axis 19 of the piercing tool. Furthermore, the diameter of the orifices 17 may be dimensioned to be the larger the smaller the angle between the middle axis 18 of the orifice and the middle axis 19 of the piercing tool. In such a case, a curtain-like jet 13 is made to extend far to the front of the piercing tool 7. It is to be noted that FIG. 2 only shows a part of a jet 13. As further illustrated in FIG. 2, single jets 20 expelled from the orifices 17 intersect one another, forming a single uniform curtain-like jet 13. Furthermore, the orifices 17 provided in the nozzle 12 are formed such that in the longitudinal cross section of the nozzle 12, they pass via substantially the same imaginary plane. In such a case, the jet 13 has the shape of a narrow curtain, as can be seen in FIG. 3. FIG. 4 is a front view showing the tip of the piercing tool 7 as seen from direction B. It can be seen also in FIG. 4 that the orifices 17 of the nozzle 12 are located successively in two lines of orifices 21 and 22.

Figure 5:
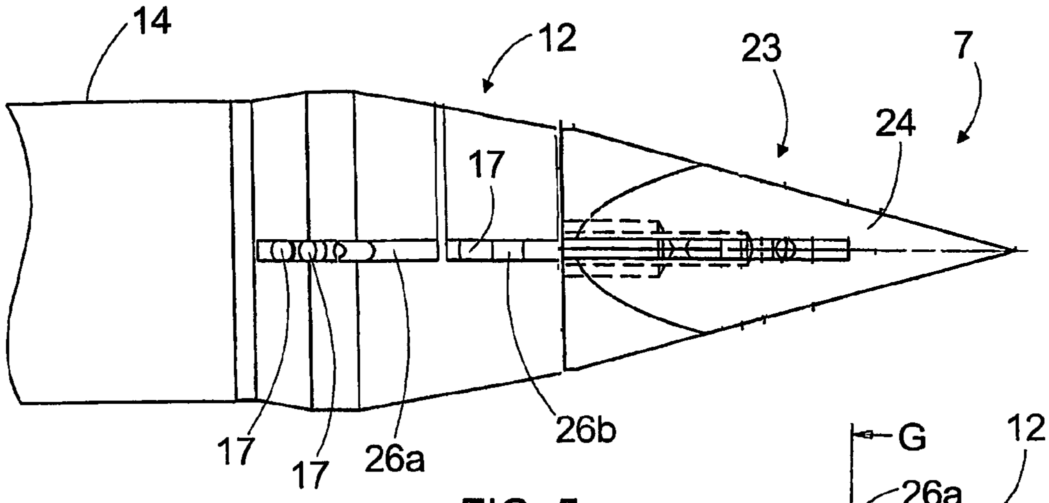
FIG. 5 is a schematic side view showing a free end of another piercing tool in accordance with the invention.
Figure 8:
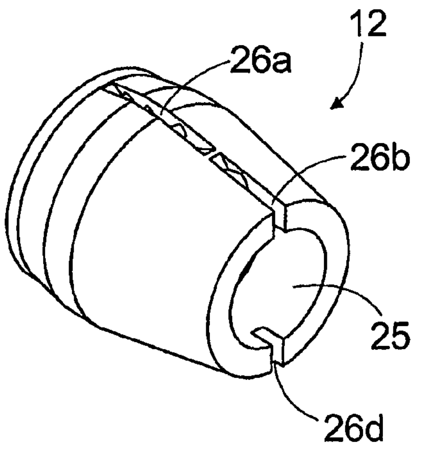
Figure 9:
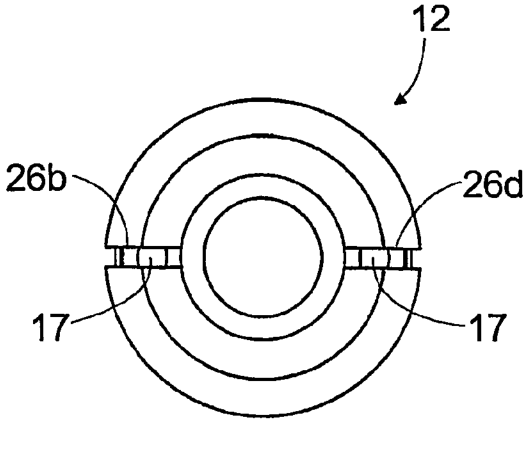
FIG. 9 is a schematic front view showing the nozzle shown in FIGS. 6 and 8, FIGS. 10 and 11 schematically show locations of orifices in the nozzle shown in FIGS. 6 to 9.

FIG. 5 shows a tip of another piercing tool 7. In this case, the shank 14 of the piercing tool 7 is provided with a separate nozzle 12 and a tip piece 23. The tip piece 23 may comprise a conical tip 24 having a circular, triangular or quadrangular cross section and, further, connecting means for fastening the tip part 23 to the piercing tool 7. The connecting means may include a pin-like section that can be inserted into a recession 25 provided in the nozzle 12, and subsequently fastened immovably by a fastening screw or the like. The recession 25 can be seen e.g. in FIG. 8. The nozzle 12 may be a sleeve-like piece arranged between the shank 14 and the tip piece 23.

As can be seen in FIGS. 5 to 9, the nozzle 12 comprises a plurality of orifices 17 directed obliquely forwards. The number, direction, location and cross section of orifices 17 affect the shape of a curtain-like jet 13. The jet 13 may also be affected by the feed pressure of a fire extinguishing medium, and the fire extinguishing medium used. At the successive orifices 17, the outer surface of the nozzle 12 is further provided with longitudinal grooves 26*a* to 26*d* that also tend to direct the jet 13 into the form of a narrow curtain. A groove may thus assist in the directing and evening out single jets. A groove may be a uniform one, having a length similar to that of an entire line of orifices 21, 22 or, as shown in FIGS. 5 to 9, a nozzle 12 may comprise two successive separate grooves 26*a*, 26*b*; 26*c*, 26*d*, resulting in a total of four grooves. The shape of the bottom of the grooves 26*a* to 26*d* may be inwardly curved, which also contributes to the formation of a curtain-like jet 13. Furthermore, such grooves 26*a* to 26*d* are quick to manufacture using e.g. a slotting cutter.

Figure 6:
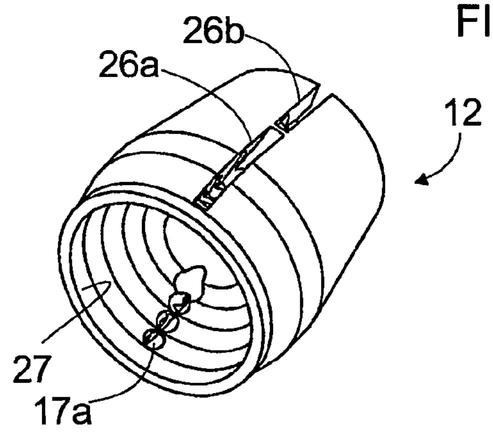
FIGS. 6 and 8 are schematic and perspective views showing a nozzle in accordance with the invention.
Figure 7:
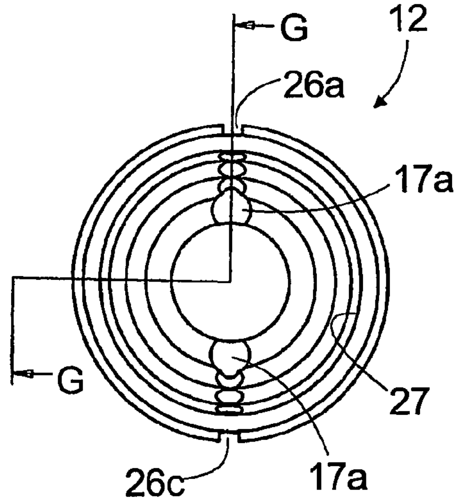
FIG. 7 is a schematic back view showing the nozzle shown in FIGS. 6 and 8.

As can be seen in FIGS. 6 and 7, the inner diameter 27 of a nozzle 12 increases gradually towards a rear part of the nozzle 12. Thus, an interior part 17*a* of all orifices 17 is well exposed so that a fire extinguishing medium is allowed to flow into the orifices 17 unobstructedly.

Figure 10:
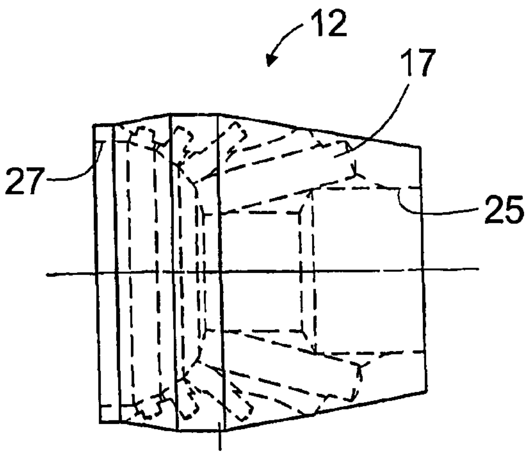
Figure 11:
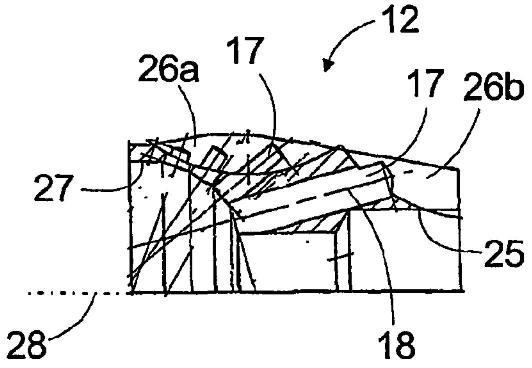

FIGS. 10 and 11 illustrate the locations of orifices 17 of the nozzle 12. The orifices 17 are arranged to pass via the same imaginary longitudinal plane surface. It can be further seen in FIG. 11 showing section G-G that the cross section of an orifice 17 is the larger the smaller the angle of the middle axis 18 of the orifice 17 with respect to the middle axis 28 of the nozzle. FIG. 10 further shows in a broken line a recession 25 intended to receive a replaceable tip piece 23.

Figure 12:
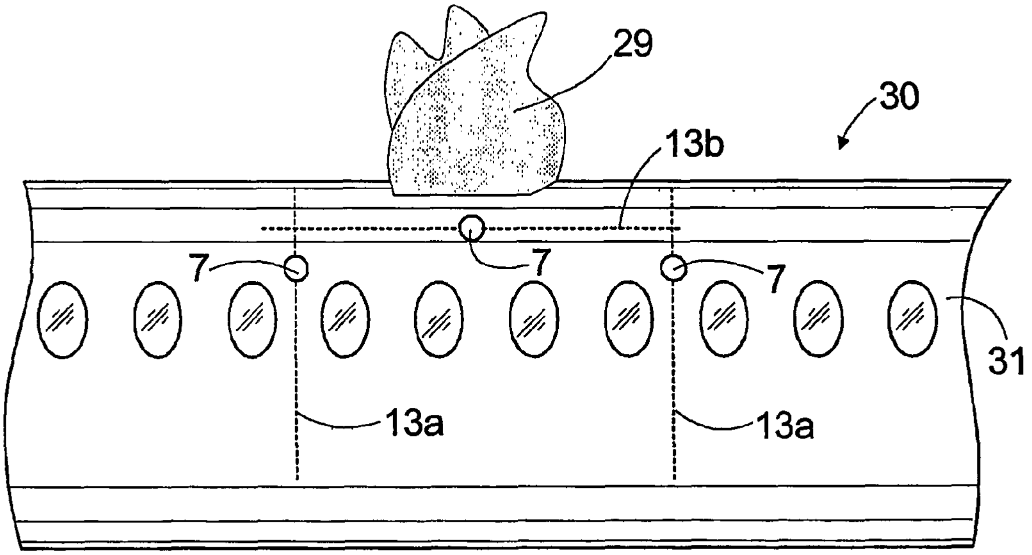
FIG. 12 is a schematic side view showing a way to confine a seat of fire, FIG. 13 schematically and as seen from the longitudinal direction of a piercing tool shows an arrangement wherein a curtain-like jet is turned with respect to the longitudinal axis of the piercing tool.

FIG. 12 illustrates the use of a rescue boom in accordance with the invention in connection with an aircraft accident. The piercing tool 7 according to the invention enables a vertical curtain-like jet 13*a* to be formed which enables a seat of fire 29 to be restricted from the rest of an aircraft 30. Such vertical jets 13*a* may be provided on both sides of the seat of fire 29 so that the fire can be prevented from expanding. In addition, toxic combustion gases can be prevented from expanding in a passenger cabin 31 of the aircraft 30. It is also possible to arrange a horizontal curtain-like jet 13*b* to restrict the seat of fire 29 from the rest of the aircraft 30. In such a case, piecing can be carried out e.g. at the upper part of the passenger cabin 31 so that the horizontal jet is formed between the passenger cabin 31 and the seat of fire 29. A piercing tool may be arranged fixedly so that it forms either a horizontal or a vertical jet 13*a*, 13*b* or, alternatively, the piercing tool 7 or the nozzle 12 can be turned with respect the longitudinal axis thereof in order to form a horizontal or a vertical jet. In some cases the jet 13 can also be turned in other desired positions.

Figure 13:
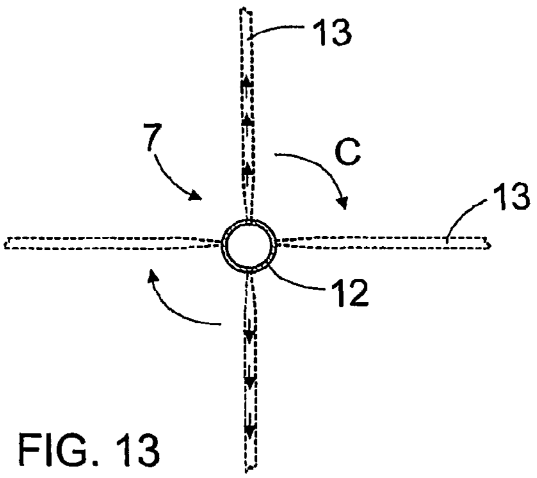

FIG. 13 illustrates a piercing tool 7 wherein the position of curtain-like jets may be changed by turning the piercing tool 7 or a nozzle 12 with respect to the longitudinal axis.

Figure 14:
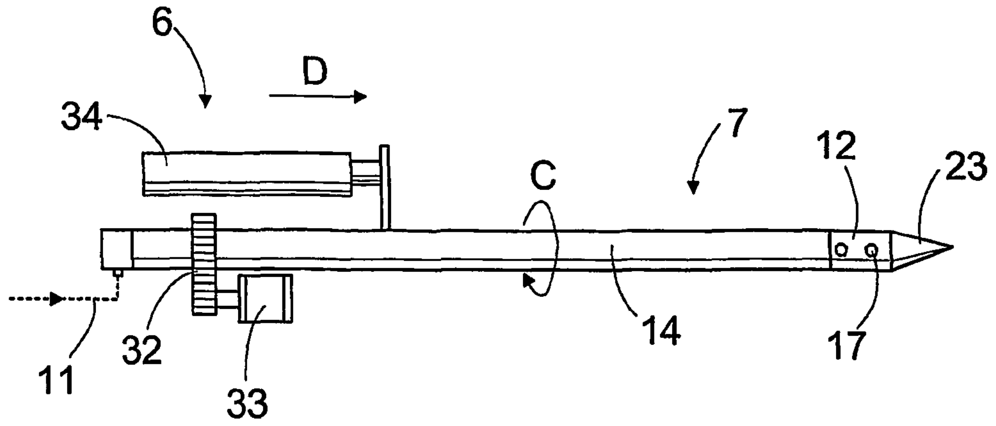
FIG. 14 is a schematic side view showing an arrangement for turning a piercing tool with respect to its longitudinal axis, FIGS. 15*a* and 15*b* schematically and as seen from the longitudinal direction of a piercing tool show a second arrangement for turning a piercing tool with respect to its longitudinal axis.

FIG. 14 is a side view showing a piercing tool 7 whose shank 14 is arranged to be turned with respect to its longitudinal axis in direction C. The shank 14 is provided with a toothed rim 32 or the like whereto a rotating force produced by a motor 33 can be transmitted. FIG. 14 further shows an actuator 34 which enables the piercing tool 7 to be pushed through a shell 8 of a burning object in direction D. The actuator 34 may be e.g. a hydraulic cylinder. On the other hand, the actuator 34 may be an impact device for generating a quick stroke in order to provide piercing.

Figures 15A, 15B, 16:
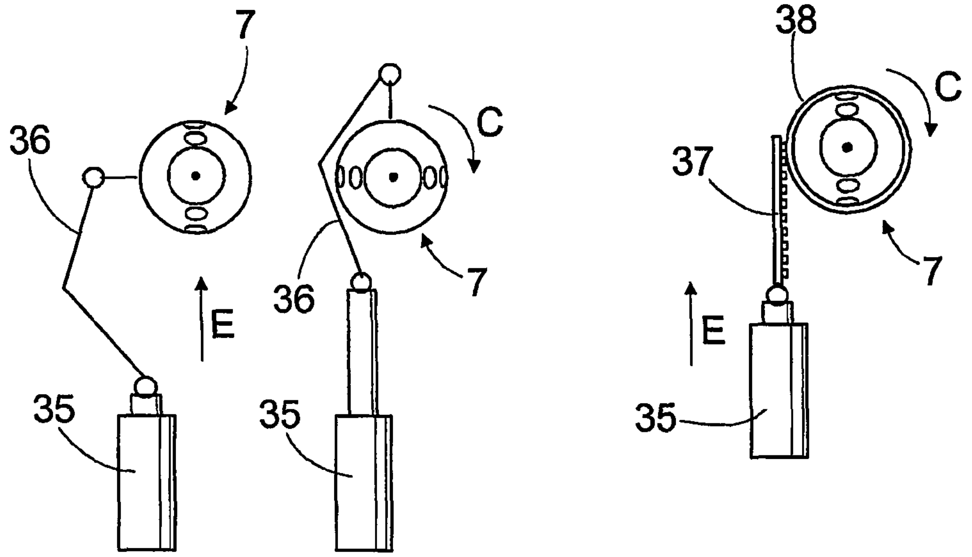
FIG. 16 is a schematic side view showing a third arrangement for turning a piercing tool with respect to its longitudinal axis.

FIGS. 15*a* and 15*b* show an arrangement wherein a piercing tool 7 is turned in direction C by means of a pressure medium cylinder 35. A linear motion E produced by the pressure medium cylinder 35 can be changed into a turning motion e.g. by means of a link mechanism 36. Alternatively, e.g. a toothed bar 37 and a toothed rim 38 arranged around the shank 14 of the piercing tool 7 may be utilized, as shown in FIG. 16.

Figure 17:
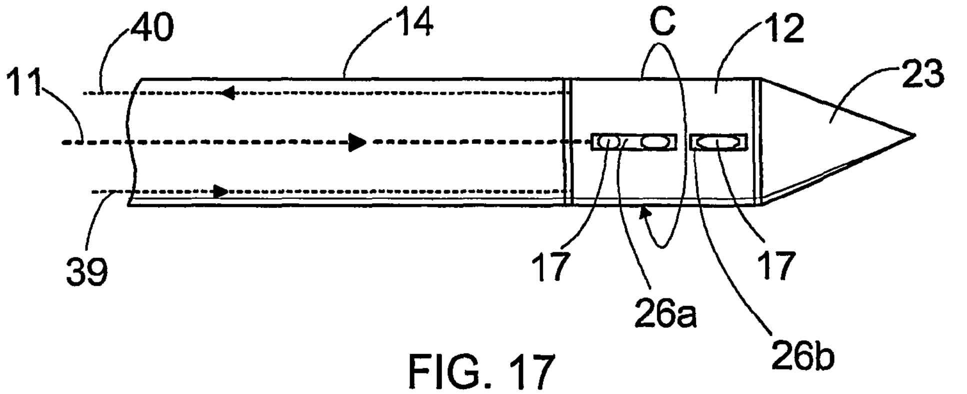
FIG. 17 is a schematic side view showing an arrangement for turning a nozzle with respect to the longitudinal axis of a piercing tool.

In a strongly simplified manner, FIG. 17 shows an arrangement wherein the shank 14 of a piecing tool 7 is not turned but, instead, a nozzle 12 is arranged to turn in direction C with respect to the shank 14. The turning of the nozzle 12 with respect to its longitudinal axis can be produced e.g. by arranging, in connection with the nozzle 12, pressure medium operated rotating elements whereto a fire extinguishing medium can be fed through a first feed channel 39 or a second feed channel 40. The turning direction of the nozzle 12 depends on which one of the channels 39, 40 is used for feeding the fire extinguishing medium to the rotating elements.

The drawings and the related description are only intended to illustrate the idea of the invention. The details of the invention may vary within the scope of the claims.

What is claimed is:

1. A method for fire-fighting, the method comprising:

piercing a shell of a burning object by pushing at least one elongated piercing tool arranged in a rescue boom from the side of a first surface of the shell to the side of a second surface thereof, feeding, along at least one longitudinal channel in the piercing tool, a fire extinguishing medium to a nozzle provided in the piercing tool, spraying the fire extinguishing medium to the side of the second surface of the shell through a plurality of orifices provided in the nozzle, and directing a plurality of single jets expelled from the orifices so that they intersect one another to form a single uniform jet having a flat curtain-like shape.

2. A method as claimed in claim 1, comprising using said jet in order to confine a seat of fire.

3. A method as claimed in claim 1, comprising turning the nozzle around the longitudinal axis of the piercing tool in order to turn the curtain-like jet.

4. A method as claimed in claim 1, comprising turning the piercing tool around its longitudinal axis in order to turn the curtain-like jet.

5. A rescue boom comprising:

a boom provided with at least one movable boom part connected to a base, at least one piercing tool arranged at a free end of the boom, the piercing tool being an elongated piece comprising at least one longitudinal channel, at least one actuator for moving the piercing tool in the longitudinal direction of the piercing tool with respect to an outermost end of the boom, at least one feed channel for feeding a fire extinguishing medium to the channel in the piercing tool, at least one nozzle, which is an elongated piece and which is connected to the channel in the piercing tool, the fire extinguishing medium being arranged to be fed through a plurality of orifices provided in the nozzle, and wherein the longitudinal cross section of the nozzle, the orifices in the nozzle are arranged to pass via substantially the same imaginary plane so that the fire extinguishing medium fed through the orifices forms a plurality of single jets which intersect one another to form a single uniform jet having a flat curtain-like shape.

6. A rescue boom as claimed in claim 5, wherein means are provided in connection with the piercing tool for turning the curtain-like jet expelled from the nozzle with respect to the longitudinal axis of the piercing tool.

7. A nozzle of a piercing tool for spraying a fire extinguishing medium, the nozzle being an elongated piece having a front end and a rear end and the nozzle comprising:

fastening means at the rear end of the nozzle for fastening the nozzle to the piercing tool, at least one feed channel for feeding a fire extinguishing medium to the nozzle, a plurality of orifices extending from the feed channel to an outer surface of the nozzle, the orifices being directed obliquely forwards such that the farther away from the front end of the nozzle a single orifice resides, the larger an acute angle between the middle axis of the orifice and the middle axis of the nozzle and wherein the longitudinal cross section of the nozzle, the orifices are arranged to pass via substantially the same imaginary plane so that the fire extinguishing medium fed through the orifices forms a plurality of single jets which intersect one another to form a single uniform jet having a flat curtain-like shape.

8. A nozzle as claimed in claim 7, wherein the cross section of the single orifices in the nozzle is dimensioned to be the larger the smaller the angle between the middle axis of the orifice and the middle axis of the nozzle so that the curtain-like jet is arranged to extend to a larger distance at the front of the nozzle than on the sides of the nozzle.

9. A nozzle as claimed in claim 7, wherein the nozzle is a sleeve-like piece, and the front end of the nozzle is provided with connecting means for fastening a separate tip piece.

10. A nozzle as claimed in claim 7, wherein in the longitudinal cross section of the nozzle, the orifices are arranged successively in a first line of orifices and in a second line of orifices, and the first line of orifices resides on a first side of the middle axis of the nozzle while the second line of orifices resides on a second side of the middle axis thereof so that the nozzle is arranged to form a uniform, curtain-like jet extending to the sides and to the front of the nozzle.

11. A nozzle as claimed in claim 7, wherein in the longitudinal cross section of the nozzle, the orifices are arranged successively in a first line of orifices and in a second line of orifices, and the first line of orifices resides on a first side of the middle axis of the nozzle while the second line of orifices resides on a second side of the middle axis thereof so that the nozzle is arranged to form a uniform, curtain-like jet extending to the sides and to the front of the nozzle, and the outer surface of the nozzle is provided with at least one longitudinal groove at the first line of orifices and at least one longitudinal groove at the second line of orifices.

12. A nozzle as claimed in claim 7, wherein in the longitudinal cross section of the nozzle, the orifices are arranged successively in a first line of orifices and in a second line of orifices, and the first line of orifices resides on a first side of the middle axis of the nozzle while the second line of orifices resides on a second side of the middle axis thereof so that the nozzle is arranged to form a uniform, curtain-like jet extending to the sides and to the front of the nozzle, and the outer surface of the nozzle is provided with at least one longitudinal groove at the first line of orifices and at least one longitudinal groove at the second line of orifices, and two longitudinal grooves are provided successively both at the first line of orifices and at the second line of orifices, and as seen from the front end of the nozzle, the first grooves extend to a section of the first orifices as seen from the front end of the nozzle only.

13. A nozzle as claimed in claim 7, wherein in the longitudinal cross section of the nozzle, the orifices are arranged successively in a first line of orifices and in a second line of orifices, and the first line of orifices resides on a first side of the middle axis of the nozzle while the second line of orifices resides on a second side of the middle axis thereof so that the nozzle is arranged to form a uniform, curtain-like jet extending to the sides and to the front of the nozzle, and the outer surface of the nozzle is provided with at least one longitudinal groove at the first line of orifices and at least one longitudinal groove at the second line of orifices, and the shape of the bottoms of the grooves in the outer surface of the nozzle is inwardly curved.

14. A method as claimed in claim 1, further comprising the step of extending a curtain-like flat jet to the front of the piercing tool.

15. A rescue boom as claimed in claim 5, wherein the orifices of the nozzle are directed obliquely forward.

16. A method for fire-fighting, the method comprising:

piercing a shell of a burning object by pushing a substantially conical nozzle of at least one elongated piercing tool arranged in a rescue boom from the side of a first surface of the shell to the side of a second surface thereof, feeding, along at least one longitudinal channel in the piercing tool, a fire extinguishing medium to the substantially conical nozzle provided in the piercing tool, spraying the fire extinguishing medium to the side of the second surface of the shell through a plurality of orifices provided in the substantially conical nozzle, the substantially conical nozzle having a solid front most portion between a front most pair of the plurality of orifices, and directing a plurality of single jets expelled from the orifices so that they intersect one another to form a single uniform jet having a flat curtain-like shape.

17. A nozzle of a piercing tool for spraying a fire extinguishing medium comprising:

a substantially conical front end for piercing a shell of a burning object;

a fastening means at a rear end of the nozzle for fastening the nozzle to the piercing tool, at least one feed channel for feeding a fire extinguishing medium to the nozzle, a plurality of orifices extending from the feed channel through the substantially conical front end to an outer surface of the nozzle, the orifices being directed obliquely forwards such that the farther away from the front end of the nozzle a single orifice resides, the larger an acute angle between the middle axis of the orifice and the middle axis of the nozzle, wherein the longitudinal cross section of the nozzle, the orifices are arranged to pass via substantially the same imaginary plane so that the fire extinguishing medium fed through the orifices forms a plurality of single jets which intersect one another to form a single uniform jet having a flat curtain-like shape; and a solid front most portion of the conical front end between a front most pair of the plurality of orifices.

* * * * *